UNITED STATES PATENT OFFICE.

WILLIAM A. LEVERING, OF CHICAGO, ILLINOIS, ASSIGNOR TO STANDARD ASPHALT & RUBBER CO., OF CHICAGO, ILLINOIS, A CORPORATION OF NEW JERSEY.

BITUMINOUS PUTTY.

1,082,640.  Specification of Letters Patent.  Patented Dec. 30, 1913.

No Drawing.  Application filed September 3, 1912.  Serial No. 718,259.

*To all whom it may concern:*

Be it known that I, WILLIAM A. LEVERING, a citizen of the United States, residing in the city of Chicago, county of Cook, in the State of Illinois, have invented certain new and useful Improvements in Bituminous Putty, of which the following is a specification.

My invention relates to a new and improved and useful product, *i. e.*, bituminous putty and has for its salient objects to produce a compound which has all the necessary and desirable characteristics of a first class putty and is nevertheless, composed of many substances hereinafter enumerated which are not found in the ordinary commercial putty; to produce a product which consists essentially of a given proportion of bituminous or asphaltic cement and a given proportion of lime dust united into a homogeneous mass; to produce a product of the above character which will not dry or crack with age, which will not burn or disintegrate under any ordinary heat, but which nevertheless, can be melted or softened when subjected to a sufficiently high temperature; to produce a product the binder of which is especially characterized by its adhesive, cementitious and cohesive qualities; to produce a product which is peculiarly able to withstand extremes of temperature, *i. e.*, will not crack in winter or soften or melt under the heat of the summer sun; to produce a product which always remains elastic regardless of changes in temperature and does not shrink with age; to produce a product which is an electric insulator; to produce a product which is adapted to a wide variety of uses not common to ordinary commercial putty such as in the expansion joints of battery cells in repairing or setting slate, tile, stone or concrete, in repairing felt, tin, gravel or other prepared roofings; to produce a product which can be economically and readily manufactured and in general to produce an improved product of the character referred to.

Commercial putties are ordinarily made from a mixture of boiled linseed oil and whiting or white lead. The characteristics and the uses of commercial putty are too well known to need elucidation. Commercial putty, however, has many limitations which are overcome in my improved product as appears in the stated objects of the invention.

I have discovered that a putty having the characteristics enumerated may be formed by combining lime dust in proper proportion with air blown asphalt. This air blown asphalt is formed from petroleum residuum, which is subjected to the action of heat and air for a considerable period of time until the liquid or said liquid residuum is solidified. This air blown petroleum residuum may be obtained in the manner described in Patents #635429 and 635430 issued to G. F. and G. C. K. Culmer. The product made in accordance with these patents is a solid or semi-solid asphaltic compound devoid of pitch and consisting of dehydrated and oxidized petroleum residuum which is chemically different from the original residuum, being higher in its asphaltene content and lower in its petrolene content than the residuum. It is known in fact as an air blown asphaltic residuum. It possesses properties materially different from those of natural asphalts or untreated petroleum residuum or compound of natural asphalts and petroleum residuums. The use of natural asphalts or untreated residuum is not satisfactory. The former is too brittle and will not stand the disintegrating action of the weather. If sufficient liquid residuum is used to soften the natural asphalt to the proper degree then the compound will be lacking in consistency necessary in a proper coating for the purposes here in question. This bituminous product forms a binder and the lime dust the foundation or carrier for the binder. They may be mixed in the proportion of 65% of lime dust to 35% of the bituminous compound the two being combined under heat by mixing instead of grinding and the percentages of the ingredients may be varied in order to obtain a putty of the desired consistency.

In its broader aspects the invention is not limited to the use of the particular bituminous product specified in the patents enumerated or to the use of lime dust. For example, fine sand, coal dust, or other comminuted mineral matter may be substituted for the lime dust and a suitable fluxed or softened asphalt or bitumen may be substituted for the air blown asphalt referred to. Care, however, must be taken to use such asphalt or bitumen as will obtain the desired results. For example, most natural asphalt would be too hard and brittle, not sufficiently elastic or rubbery to serve the purpose.

I claim as my invention:

1. The herein described product consisting of a major portion of mineral dust mixed with a minor portion of an air blown asphalt formed from dehydrated and oxidized petroleum residuum of a solid or semi-solid consistency, markedly higher in its content of asphaltene and lower in its petrolene content than the residuum from which said asphaltic product was formed, said mixture forming a bituminous body.

2. The herein described product consisting of a major portion of lime dust and a minor portion of air blown petroleum residuum, said constituents when united forming a bituminous putty.

3. The herein described product consisting of a mixture of mineral dust and an asphaltic compound formed from dehydrated and oxidized petroleum residuum of a solid consistency, said asphaltic compound being markedly higher in its asphaltene content and lower in its petrolene content than the residuum from which said asphaltic compound is formed, said mixture forming a bituminous putty.

4. The herein described product consisting of a mixture of the major portion of finely comminuted mineral matter and a minor portion of air blown petroleum residuum, said mixture forming a bituminous putty of an elastic rubbery character impervious to the disintegrating action of the weather.

WILLIAM A. LEVERING.

Witnesses:
F. G. BELKNAP,
ED. C. ENNIS.